O. POLKINGHARN.
COOP TAG HOLDER.
APPLICATION FILED SEPT. 19, 1919.
1,335,077.
Patented Mar. 30, 1920.
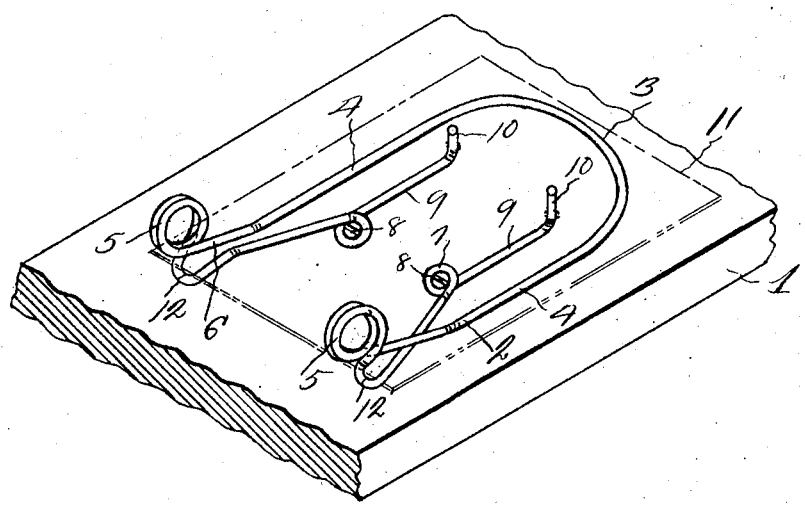
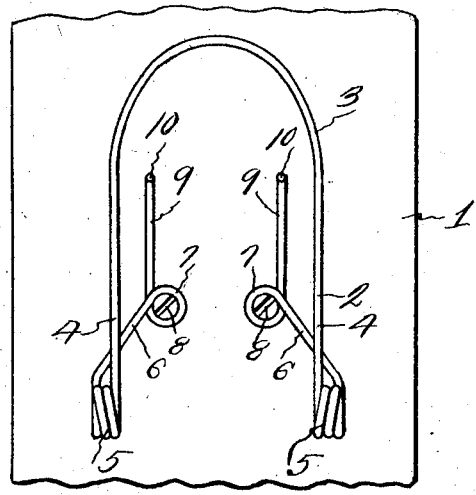
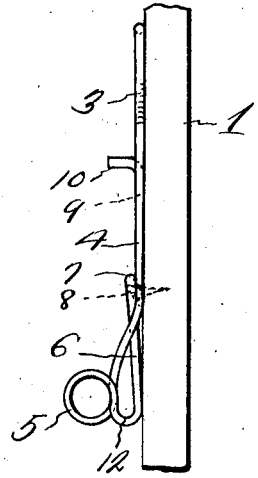
Inventor
O. Polkingharn
By
D. Swift
Attorney

UNITED STATES PATENT OFFICE.

ORIL POLKINGHARN, OF MARNE, IOWA.

COOP TAG-HOLDER.

1,335,077.   Specification of Letters Patent.   Patented Mar. 30, 1920.

Application filed September 19, 1919. Serial No. 324,929.

*To all whom it may concern:*

Be it known that I, ORIL POLKINGHARN, a citizen of the United States, residing at Marne, in the county of Cass, State of Iowa, have invented a new and useful Coop Tag-Holder; and I do hereby declare the following to be a full, clear, and exact description of the invention, such as will enable others skilled in the art to which it appertains to make and use the same.

The invention relates to tag holders and has for its object to provide a tag holder which is particularly adapted for use in connection with poultry coops so as to obviate the necessity of nailing the shipping tag on each coop.

A further object is to provide a poultry coop tag holder formed from a single piece of wire so bent as to form members adapted to be secured to the poultry coop, said members having upstanding arms adapted to pierce the tag, one end of the members secured to the coop having coil springs and a looped member overlying the members secured to the coop and adapted to hold the tag in close engagement with the coop and the upstanding arms in position through the tag.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the tag holder showing the same applied to a portion of a coop.

Fig. 2 is a plan view of the tag holder.

Fig. 3 is a side elevation of the tag holder.

Referring to the drawings the numeral 1 designates a portion of a coop or other shipping receptacle and 2 the tag holder. The tag holder comprises a U-shaped clamping member 3, having arms 4 which arms at their ends are coiled so as to form coil springs 5, said coils extending outwardly. The wires forming the coils having their ends extending toward the apex of the U-shaped clamping member 3 and extend inwardly, as at 6. The inner ends of the inwardly extending wires 6 are formed with loops 7 forming apertures for the reception of securing screws 8 which are adapted to pass therethrough and be embedded in the coop or shipping receptacle. Loops 7 having been formed, the wires extend toward the apex of the U-shaped clamping member 3, said ends 9 being in substantially parallel relation to the arms 4 of the U-shaped clamping member 3. The ends 9 terminate in upwardly extending right angle members 10 adapted to be forced through the shipping tag 11 when the U-shaped member has been raised and the tag placed under the same.

The operation is as follows: The operator grasps the U-shaped clamping member 3 raises the same upwardly against the action of the coil spring 5, then he places the tag which has been previously addressed under the U-shaped member, after which the U-shaped member is released thereby allowing said U-shaped member to clamp the shipping tag 11 in place against the slat of the coop at the same time, the U-shaped member also forces the right angle members 10 through the shipping tag, said right angle members preventing wabbling or displacement of the tag under the U-shaped clamping member. The tag is also additionally held against displacement by one of the edges engaging the recesses 12.

From the above it will be seen that a shipping tag holder is provided which may be cheaply constructed and one wherein the holder as a whole is formed from a single piece of spring wire.

The invention having been set forth what is claimed as new and useful is:—

A tag holder formed from a single piece of spring wire, said wire being bent so as to form a U-shaped clamping member, the arms of said clamping member near their ends being bent outwardly and terminating in spring coils, said coils being disposed on the outer sides of the spring arms, said wire being bent so as to form rearwardly extending loops disposed below the spring coils thereby forming limiting means for a tag during a clamping operation, the lower arms of said rearwardly extending loops being bent inwardly and inclining toward each other and toward the front end of the U-shaped clamping member, loops in said forwardly and inwardly extending arms for the reception of securing means for securing the clamp as a whole to a crate or box, said loops being provided with forwardly extending arms, the forward ends of said arms being provided with right angle upstanding arms adapted to penetrate the tag, and hold the same when the clamping member is forced downwardly by means of the coiled spring.

In testimony whereof I have signed my name to this specification in the presence of two subscribing witnesses.

ORIL POLKINGHARN.

Witnesses:
JOHN BEEBEE,
J. T. CLASEN.